United States Patent [19]

Detloff

[11] Patent Number: 4,675,994

[45] Date of Patent: Jun. 30, 1987

[54] LOCKSMITH'S TOOL FOR INSTALLING SPRINGS AND DRIVER PINS INTO PIN TUMBLER LOCKS

[76] Inventor: John C. Detloff, 8703 Greenford Dr., Richmond, Va. 23229

[21] Appl. No.: 862,257

[22] Filed: May 12, 1986

[51] Int. Cl.[4] .......... B23P 19/04

[52] U.S. Cl. .......... 29/804; 29/270

[58] Field of Search .......... 29/270, 804, 263, 278; 81/112-114, 119, 125.1, 3.8

[56] References Cited

U.S. PATENT DOCUMENTS

| | | | |
|---|---|---|---|
| 422,013 | 2/1890 | Ekstrom | 29/263 X |
| 1,156,764 | 10/1915 | Druck | 81/114 |
| 1,200,430 | 10/1916 | Rosenstein | 81/114 X |
| 1,438,391 | 12/1922 | Nutter | 81/114 |
| 1,531,567 | 3/1925 | Niblock | 81/3.8 |
| 1,596,678 | 8/1926 | Miller | 29/270 |
| 3,218,699 | 11/1965 | Maese | 29/804 X |
| 3,664,007 | 5/1972 | Schlage | 29/804 X |
| 4,059,883 | 11/1977 | Osborne | 29/263 X |

*Primary Examiner*—Frederick R. Schmidt
*Assistant Examiner*—Steven P. Schad
*Attorney, Agent, or Firm*—Norman B. Rainer

[57] ABSTRACT

A hand-held tool for gripping and manipulating pins of pin tumbler locks. The tool is comprised of an elongated rigid handle having a forward extremity equipped with two interactive prongs capable of adjustable flexural movement. The prongs can be pressed radially against a pin to grip it. The gripped pin can then be inserted into the pin chamber of a pin tumbler lock.

9 Claims, 6 Drawing Figures

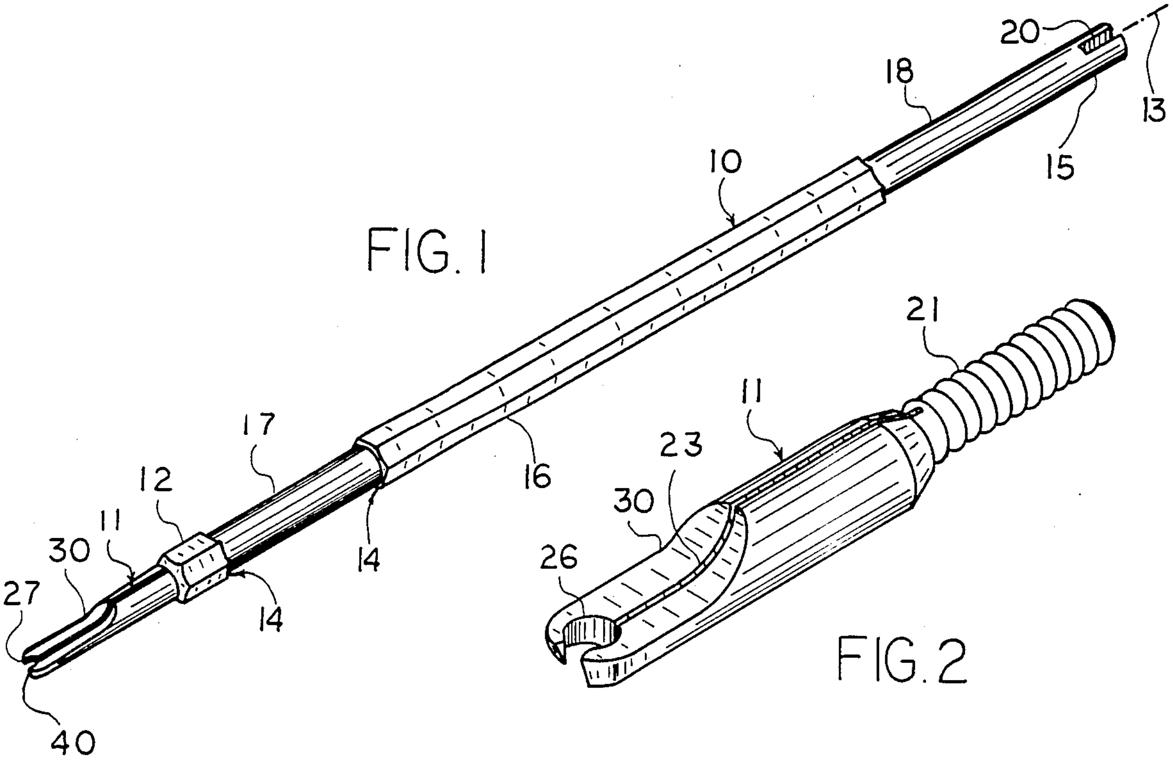
FIG. 1
FIG. 2
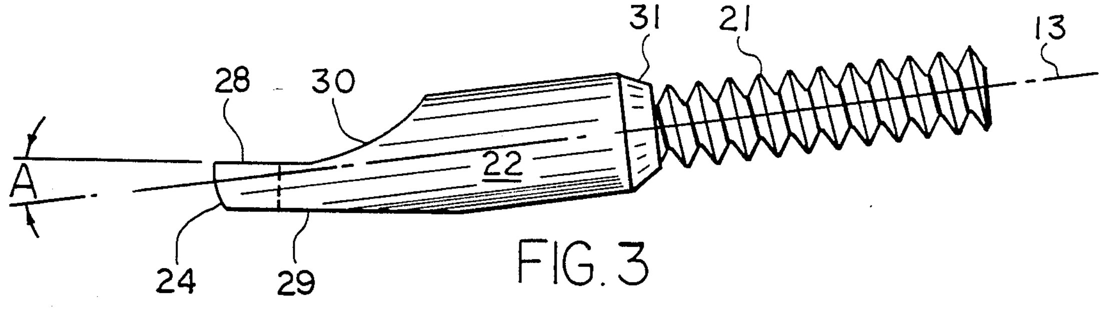
FIG. 3
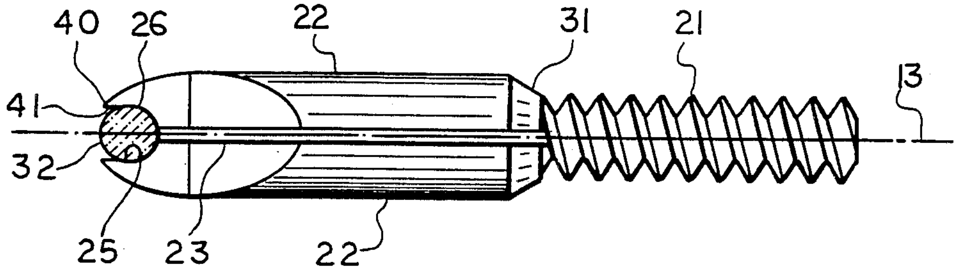
FIG. 4

LOCKSMITH'S TOOL FOR INSTALLING SPRINGS AND DRIVER PINS INTO PIN TUMBLER LOCKS

BACKGROUND OF THE INVENTION

This invention concerns a tool for the precise gripping and manipulation of small objects, and more particularly concerns a hand-held tool for handling the driver pins and springs of a pin tumbler lock.

In pin tumbler locks of conventional design, a plug which is a cylinder having a series of radially disposed channels is rotatably mounted within a cylindrical bore in a housing having a matching series of straight channels, known as "pin chambers", which open upon said bore and are closed at their opposite extremities, furthest from the bore. Each pin chamber is adapted to confine a coil spring in abutment with said close extremity, and a driver pin or pin tumbler which is urged toward the plug by the spring.

In the area of locksmith work, it is often found necessary to reinstall driver pins and springs that have been removed from a pin tumbler lock upon its disassembly. The fact that the pin is under pressure from the spring requires that, as each pin is forcibly restored to its proper chamber, it must immediately be held in place when the restoring force is removed. Such holding effect is achieved by a tool, known as a plug follower, which enters the bore in close-fitting sliding engagement therewith and permits displacement by said plug. Any tool for holding and installing the driver pins must therefore be compatible with the function of the plug follower, and would have enhanced value if it could smultaneously hold both the driver pin and corresponding spring.

It is the current practice in the locksmith trade to use tweezers to grip and manipulate driver pins and springs during installation and disassembly operations. Since the gripping action of the tweezers is dependent upon the force applied by the locksmith's fingers, the pins or springs may accidentally be dropped if insufficient force is applied, and the springs may be crushed if the gripping force is excessive. A constant and adequate gripping force is difficult to achieve not only because of the inconsistency of finger force but also because the compressive force applied by opposed fingers at any given site along the length of the tweezers may have varied effect at the gripping extremity of the tweezers due to flexibility in the arms of the tweezers and leverage factors.

It is accordingly an object of the present invention to provide a tool for installing the driver pins and springs into a pin tumbler lock.

It is another object of this invention to provide a tool as in the foregoing object whose gripping force is precise and adjustable.

It is a further object of the present invention to provide a tool of the aforesaid nature specially adapted to install driver pins against spring pressure.

It is a still further object of this invention to provide a tool of the aforesaid nature having the capability of simultaneously holding a driver pin and associated spring.

It is yet another object of the present invention to provide a tool of the aforesaid nature of rugged and durable construction amenable to low cost manufacture.

These objects and other objects and advantages of the invention will be apparent from the following description.

SUMMARY OF THE INVENTION

The above and other beneficial objects and advantages are accomplished in accordance with the present invention by a tool comprising:

(a) an elongated rigid handle having opposed forward and rear extremities, said forward extremity having an internally threaded socket coaxially aligned with the axis of elongation of said handle, (b) an adjustable bifurcated gripping head of monolithic construction comprising an externally threaded mounting post adapted to engage said threaded socket, and paired prongs forwardly emergent from said post and disposed in facing juxtaposition about a slot of substantially uniform width extending into said mounting post, said prongs being capable of flexing movement relative to said slot and having forward distal extremities having:

(i) facing arcuate gripping surfaces which in combination define a forwardly opening gripping channel of generally circular cylindrical interior contour, and (ii) opposed upper and lower parallel flat surfaces perpendicularly disposed to the cylindrical axis of said gripping channel and spaced apart to define a thickness smaller than the general thickness of the prongs, the rearward extremities of said prongs having an abutment shoulder conically tapered to merge with said mounting post, and (c) compressive means threadably associated with said mounting post and adapted to be advanced into seated engagement with said abutment shoulder, whereby (d) when said compressive means is advanced tightly against said abutment shoulder, the force required for flexural movement of the prongs is increased, thereby enabling the gripping channel to more strongly hold an object of cylindrical shape.

In preferred embodiments of the invention, the rear extremity of the handle may be equipped with means, such as a notch, for holding springs. The gripping head is preferably produced by the machining of round bar stock. The flat lower surfaces of the distal extremities of the prongs are preferably inclined forwardly toward the axis of the gripping head, the angle of said lower surfaces with respect to said axis preferably being in the range of 5 degrees to 10 degrees. The upper surfaces of the prongs adjacent their distal extremities are preferably provided with an arcuately contoured recess which merges with the flat upper surfaces of said distal extremities. The forwardly opening gripping channel is preferably configured such that the opening is substantially symmetrically disposed about the tool axis, and represents between about 80 degrees and 100 degrees of the circular cross-sectional configuration of the gripping channel. The compressive means may be a collar nut threadably positioned upon the mounting post between the prongs and the forward extremity of the handle. The handle is preferably a monolithic structure having a central gripping portion which tapers to small diameter portions adjacent each extremity.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a perspective view of an embodiment of the tool of this invention in substantially actual size.

FIG. 2 is an enlarged perspective view of the gripping head component of the tool of FIG. 1.

FIG. 3 is a side view of the gripping head of FIG. 2.

FIG. 4 is a top view of the gripping head of FIG. 2 in operative association with a driver pin.

Figure 5:
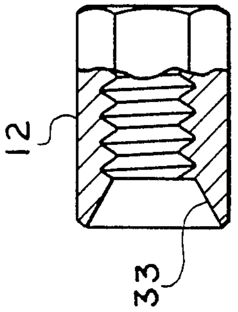
FIG. 5 is an enlarged sectional view of the compressive nut component of the tool of FIG. 1.

For convenience of description, the term "forward", or expressions of equivalent import will have reference to the left extremity of the tool as shown in FIG. 1.

DESCRIPTON OF THE PREFERRED EMBODIMENT

Referring to FIG. 1, an embodiment of the tool of the present invention is shown comprised of handle 10, gripping head 11, and compressive nut 12 disposed between said handle and gripping head, all components of said tool being fabricated of metal.

Handle 10 is a straight member having been machined from hexagonal bar stock and having a center axis 13, a forward extremity 14, and rear extremity 15. Axis 13 further represents the general axis of the tool. The center region 16 of the handle is preferably provided with means for minimizing unwanted rotative motion of the tool in the hand of the user. In the illustrated embodiment, such rotation-preventing means consists of a center region having a cross-section of hexagonal shape and relatively large size. In other embodiments, said rotation-preventing means may be a knurled region, a non-slip coating, or equivalent alternative features.

Figure 6:
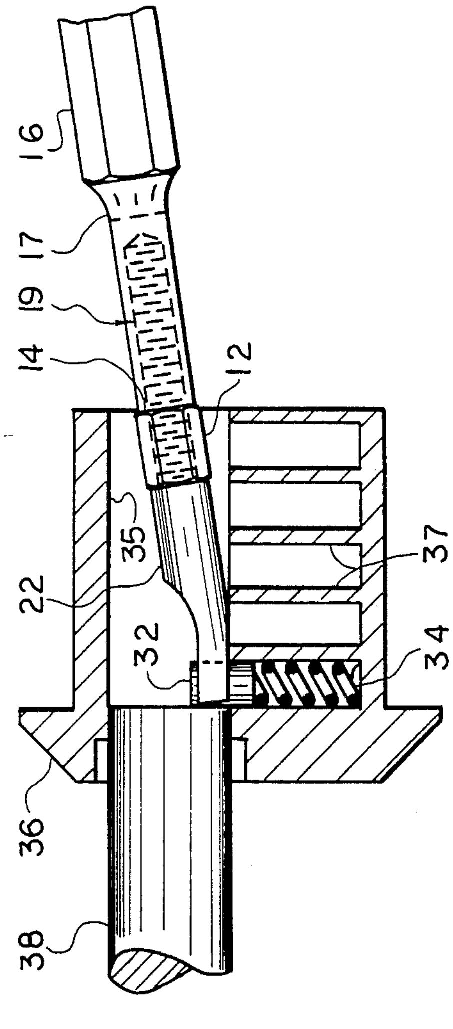
FIG. 6 is a fragmentary side view of the tool of FIG. 1 shown in operative association with the bore of a pin tumbler lock, and a plug follower.

The handle is further comprised of terminal shaft portions 17 and 18 adjacent the forward and rear extremities, respectively, said shaft portions being of sufficiently small diameter to conveniently fit within the bore of the lock being worked upon. Suitable diameters of said shaft portions may be in the range of $\frac{1}{8}$ to $\frac{1}{4}$ inch. As best shown in FIG. 6, a threaded socket 19 is disposed within shaft portion 17 in coaxial alignment with axis 13, and opening upon forward extemity 14. Rear extremity 15 is provided with a notch 20 having a width of adequate size to firmly grip a tumbler spring.

Gripping head 11, best shown in FIGS. 2 and 3, is of monolithic construction, having been machined from a single piece of bar stock. Said gripping head is comprised of a portion in the form of externally threaded mounting post 21 adapted to engage threaded socket 19, and paired prongs 22 forwardly emergent from said post. Said prongs, having a cylindrical outer contour, are disposed in facing juxtaposition about slot 23 of substantially uniform width extending into said mounting post. The prongs are capable of flexural movement relative to said slot. The forward or distal extremities 24 of the prongs have facing interior arcuate gripping surfaces 25 which in combination define a gripping channel 26 of generally circular cylindrical contour having a forwardly directed opening 27 which is substantially symmetrically disposed about the tool axis 13. The exterior surfaces of distal extremities 24 are rounded in a generally circular arc about the center of channel 26 and in a manner to cause tapering formation of opposed tips 40 having flat opposing interior surfaces 41 which communicate with channel 26 and bound opening 27. The diameter of channel 26 of the illustrated embodiment is 0.113 inch, and the corresponding width of opening 27 is 0.100 inch, measured between surfaces 41. Such configuration and dimensions are critically chosen so that a pin held within gripping channel 26 will extend radially forwardly through opening 27 beyond distal extremity 24, as illustrated in FIGS. 4 and 6.

Opposed upper and lower parallel flat surfaces 28 and 29, respectively, are disposed adjacent said distal extremities in perpendicular relationship to the cylindrical axis of channel 26. The spacing between said flat surfaces is such as to define a thickness (0.070 inch in the exemplified embodiment) smaller than the general thickness of the prongs. Said surfaces 28 and 29 are disposed to the tool axis at an angle, designated as angle A in FIG. 3, having a value between about 5 degrees and 10 degrees. An arcuately contoured surface 30, convexly disposed to the tool axis, is positioned in merging contact with the rearmost extremity of upper flat surface 28.

The rearward or proximal extremities of the prongs have an abutment shoulder 31 conically tapered to merger with mounting post 21. The angle of said conical taper with respect to the tool axis is 61 degrees in the exemplifed embodiment. It is to be noted that said abutment shoulder embraces slot 23.

Compression means in the form of compression nut 12, best shown in FIG. 5, threadably engages mounting post 21. The forward opening 33 of said nut is outwardly flared in a manner to closely correspond to the contour of abutment shoulder 31. The angle of said outward flare with respect to the tool axis is 60 degrees in the exemplified embodiment. When compression nut 12 is threadably advanced into seated engagement with said abutment shoulder, the distal extremities of the prongs are urged closer together. A correspondingly greater force is required to move the prongs apart. In alternative embodiments, the compression means may be an integral part of handle 10.

In using the tool, a driver pin 32 is picked up by pressing the distal extremities of the prongs radially upon the pin adjacent one of its ends, such that most of the pin will extend below lower surfaces 29. Then, a spring 34 is picked up by pushing notch 20 radially against the spring adjacent one of its ends, thereby leaving most of the spring extending from the tool.

In a manner analogous to that shown in FIG. 6, the extremity of the tool holding the spring is inserted into the bore 35 of pin tumbler lock 36. The spring is lowered into pin chamber 37, the tool is brought down against the bottom of the bore, and is pulled straight out of said bore. The extremity of the tool holding the driver pin is then inserted into the bore to place the pin atop the spring in pin chamber 37, and is then brought down against the bottom of the bore. A plug follower 38 is brought into firm contact with the upper extremity of the driver pin. Such action holds the position of the driver pin against the urging of the spring. The tool is pulled straight back a short distance to release the pin. It is to be noted that, unless the follower were in holding abutment with the driver pin, the tool could not be removed without permitting the spring to push the driver pin upwardly out of the pin chamber. The lower surfaces 29 of the distal extremities of the prongs are then placed on top of the pin to push it down, thereby allowing the follower to be advanced to cover the pin. When all said pin chambers have been sequentially loaded in such manner, the plug follower is replaced by the plug, thereby completing the re-assembly of the lock.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A hand-held tool for gripping driver pins of pin tumbler locks comprising:

(a) an elongated rigid handle having opposed forward and rear extremities, said forward extremity having an internally threaded socket coaxially aligned with the axis of elongation of said handle, (b) an adjustable bifurcated gripping head of monolithic construction comprising an externally threaded mounting post adapted to engage said threaded socket, and paired prongs forwardly emergent from said post and disposed in facing juxtaposition about a slot of substantially uniform width extending into said mounting post, said prongs being capable of flexural movement relative to said slot and having forward extremities having:

(i) facing arcuate gripping surfaces which in combination define a forwardly opening gripping channel of generally circular cylindrical interior contour, and (ii) opposed upper and lower parallel flat surfaces perpendicularly disposed to the cylindrical axis of said gripping channel and spaced apart to define a thickness smaller than the general thickness of the prongs, and rearward extremities having an abutment shoulder conically tapered to merge with said mounting post, and (c) compressive means threadably associated with said mounting post and adapted to be advanced into seated engagement with said abutment shoulder, whereby (d) when said compressive means is advanced tightly against said abutment shoulder, the force required for flexural movement of the prongs is increased, thereby enabling the gripping channel to more strongly hold an object.

2. The tool of claim 1 wherein the lower surfaces of the forward extremities of the prongs are inclined forwardly toward said axis of elongation.

3. The tool of claim 2 wherein the angle of inclination of said lower surfaces with respect to said axis is in the range of 5 to 10 degrees.

4. The tool of claim 1 wherein the opening of said forwardly opening gripping channel is substantially symmetrically disposed about said axis.

5. The tool of claim 4 wherein said opening represents between about 80 and 100 degrees of the generally circular contour of said gripping channel.

6. The tool of claim 1 wherein said compressive means is a collar threadably positioned upon said mounting post.

7. The tool of claim 1 wherein the exterior surfaces of the forward extremities of said prongs are rounded to form opposed tips having facing flat interior surfaces.

8. The tool of claim 7 wherein said opening is defined by the facing flat interior surfaces of said tips.

9. The tool of claim 1 wherein said gripping channel is positioned such that a standard driver pin held therein will extend radially forwardly of the forward extremities of said prongs.

* * * * *